(12) United States Patent
Sakata et al.

(10) Patent No.: US 12,257,997 B2
(45) Date of Patent: Mar. 25, 2025

(54) VEHICLE BRAKING DEVICE

(71) Applicant: ADVICS CO., LTD., Kariya (JP)

(72) Inventors: Yasunori Sakata, Kariya (JP); Akihito Kusano, Kariya (JP)

(73) Assignee: ADVICS CO., LTD., Kariya (JP)

( * ) Notice: Subject to any disclaimer, the term of this patent is extended or adjusted under 35 U.S.C. 154(b) by 464 days.

(21) Appl. No.: 17/640,876

(22) PCT Filed: Sep. 17, 2020

(86) PCT No.: PCT/JP2020/035346
§ 371 (c)(1),
(2) Date: Mar. 7, 2022

(87) PCT Pub. No.: WO2021/060162
PCT Pub. Date: Apr. 1, 2021

(65) Prior Publication Data
US 2022/0324426 A1 Oct. 13, 2022

(30) Foreign Application Priority Data
Sep. 27, 2019 (JP) .................................. 2019-177521

(51) Int. Cl.
*B60T 8/94* (2006.01)
*B60T 13/68* (2006.01)
*B60T 17/22* (2006.01)

(52) U.S. Cl.
CPC .............. *B60T 8/94* (2013.01); *B60T 13/686* (2013.01); *B60T 17/22* (2013.01);
(Continued)

(58) Field of Classification Search
CPC . B60T 8/94; B60T 8/40; B60T 8/4081; B60T 13/68; B60T 13/686; B60T 17/22;
(Continued)

(56) References Cited

U.S. PATENT DOCUMENTS 5,172,963 A * 12/1992 Brown .................. B60T 13/686
303/119.2
5,951,120 A * 9/1999 Shimura ................... B60T 8/94
303/162

(Continued)

OTHER PUBLICATIONS

International Search Report (PCT/ISA/210) with English translation and Written Opinion (PCT/ISA/237) mailed on Nov. 10, 2020, by the Japanese Patent Office as the International Searching Authority for International Application No. PCT/JP2020/035346.

*Primary Examiner* — Thomas J Williams
(74) *Attorney, Agent, or Firm* — BUCHANAN INGERSOLL & ROONEY PC (57) ABSTRACT

A vehicle braking device includes a first supply device that supplies brake fluid to wheel cylinders, a first supply path that connects the first supply device and the wheel cylinders, and first and second electromagnetic valves provided on the first supply path. The first electromagnetic valve is disposed on the first supply path such that a seating direction of the first electromagnetic valve and a brake fluid supply direction are opposite each other, the seating direction is a direction in which a valve body is seated on a valve seat, and the brake fluid supply direction is a direction in which the brake fluid flows from the first supply device to the wheel cylinders through the first supply path. The second electromagnetic valve is disposed on the first supply path such that a seating direction of the second electromagnetic valve and the brake fluid supply direction are the same.

6 Claims, 4 Drawing Sheets

(52) U.S. Cl.
CPC ... *B60T 2270/402* (2013.01); *B60T 2270/406* (2013.01); *B60T 2270/88* (2013.01)

(58) Field of Classification Search
CPC ........... B60T 2270/88; B60T 2270/402; B60T 2270/406
See application file for complete search history.

(56) References Cited

U.S. PATENT DOCUMENTS

| | | | | |
|---|---|---|---|---|
| 6,123,397 | A * | 9/2000 | Ohtomo | B60T 8/90 303/116.1 |
| 10,189,456 | B2 | 1/2019 | Foitzik et al. | |
| 2007/0252428 | A1* | 11/2007 | Okano | B60T 8/4081 303/113.1 |
| 2012/0215414 | A1* | 8/2012 | Watanabe | B60T 8/4081 701/70 |
| 2014/0210253 | A1* | 7/2014 | Okano | B60T 11/16 303/6.01 |
| 2022/0324426 | A1* | 10/2022 | Sakata | B60T 7/042 |

* cited by examiner

VEHICLE BRAKING DEVICE

TECHNICAL FIELD

The present disclosure relates to a vehicle braking device.

BACKGROUND ART

The vehicle braking device is provided with, for example, a supply device that supplies brake fluid to a connection destination, a supply path that connects the supply device and a first wheel cylinder, a normally-closed type electromagnetic valve provided on the supply path, and a control unit that controls the supply device and the electromagnetic valve. The control unit operates the supply device, opens the electromagnetic valve, whereby the brake fluid is supplied to the first wheel cylinder, a hydraulic pressure (wheel pressure) of the first wheel cylinder increases, and a braking force increases. Such a vehicle braking device is described in, for example, the specification of U.S. patent Ser. No. 10/189,456.

CITATION LIST

Patent Literature

PTL 1: specification of U.S. patent Ser. No. 10/189,456

SUMMARY

Technical Problem

Here, when it is desired to stop a flow of the brake fluid from the first wheel cylinder to the supply device, an electromagnetic valve is closed. On the other hand, when it is desired to stop the supply of the brake fluid from the supply device to the first wheel cylinder during an operation of the supply device, the electromagnetic valve is also closed. In addition to the first wheel cylinder, a connection destination of the supply device may exist, for example, a second wheel cylinder. Therefore, for example, when the supply device supplies the brake fluid only to a connection destination other than the first wheel cylinder, the electromagnetic valve connected to the first wheel cylinder is also closed to maintain a hydraulic pressure when the supply device is in operation.

A normally-closed type electromagnetic valve is structurally closed with a maximum force in a non-energized state. That is, in the non-energized state, a valve body of the electromagnetic valve is pressed against a valve seat by a biasing force of a spring. However, when a force applied due to a differential pressure between an inlet and an outlet of the electromagnetic valve is in a direction opposite to that of the biasing force and exceeds the maximum biasing force, the valve body is separated from the valve seat, and the electromagnetic valve is opened even in the non-energized state. Thus, the structure of the electromagnetic valve determines the maximum differential pressure, that is, a differential pressure resistance, under which valve-closing in the non-energized state can be maintained.

Therefore, when it is desired to reliably close the electromagnetic valve even when a high differential pressure state occurs, it is necessary to increase the differential pressure resistance of the electromagnetic valve. However, in order to increase the differential pressure resistance of the electromagnetic valve, it is necessary to increase a size of the electromagnetic valve, which leads to an increase in size of the device. In addition, development of a dedicated electromagnetic valve also causes an increase in production cost.

An object of the disclosure is to provide a vehicle braking device capable of reliably disconnecting a supply device and a wheel cylinder while preventing an increase in size of the device.

Solution to Problem

The vehicle braking device according to the disclosure includes: a first supply device configured to supply brake fluid to a first wheel cylinder; a first supply path configured to connect the first supply device and the first wheel cylinder; and a first electromagnetic valve and a second electromagnetic valve which are provided on the first supply path. Each of the first electromagnetic valve and the second electromagnetic valve includes a valve body, a valve seat, and a biasing member for biasing the valve body, the first electromagnetic valve is disposed on the first supply path such that a seating direction of the first electromagnetic valve and a brake fluid supply direction are opposite to each other, the seating direction is a direction in which the valve body is seated on the valve seat, the brake fluid supply direction is a direction in which the brake fluid flows from the first supply device to the first wheel cylinder through the first supply path, and the second electromagnetic valve is disposed on the first supply path such that a seating direction of the second electromagnetic valve and the brake fluid supply direction are the same as each other.

Advantageous Effects

When the first supply path is shut off while the first supply device is in operation, the first electromagnetic valve and the second electromagnetic valve are closed. Here, when the first supply device supplies the brake fluid toward the first wheel cylinder, a direction of a force applied to the second electromagnetic valve due to a differential pressure (hydraulic pressure) is the seating direction thereof, that is, a direction in which the valve is closed. In other words, since the brake fluid applies a force in the same direction as a biasing force of the biasing member, at least the second electromagnetic valve can reliably shut off the first supply path regardless of the magnitude of the differential pressure. As compared with an increase in size of the electromagnetic valve in order to increase the differential pressure resistance of the electromagnetic valve, providing two electromagnetic valves is advantageous in terms of cost because the increase in size of the device can be prevented and existing electromagnetic valves can be used. Therefore, it is possible to reliably disconnect the first supply device and the first wheel cylinder while preventing the increase in size of the device.

DESCRIPTION OF EMBODIMENTS

Figure 1:
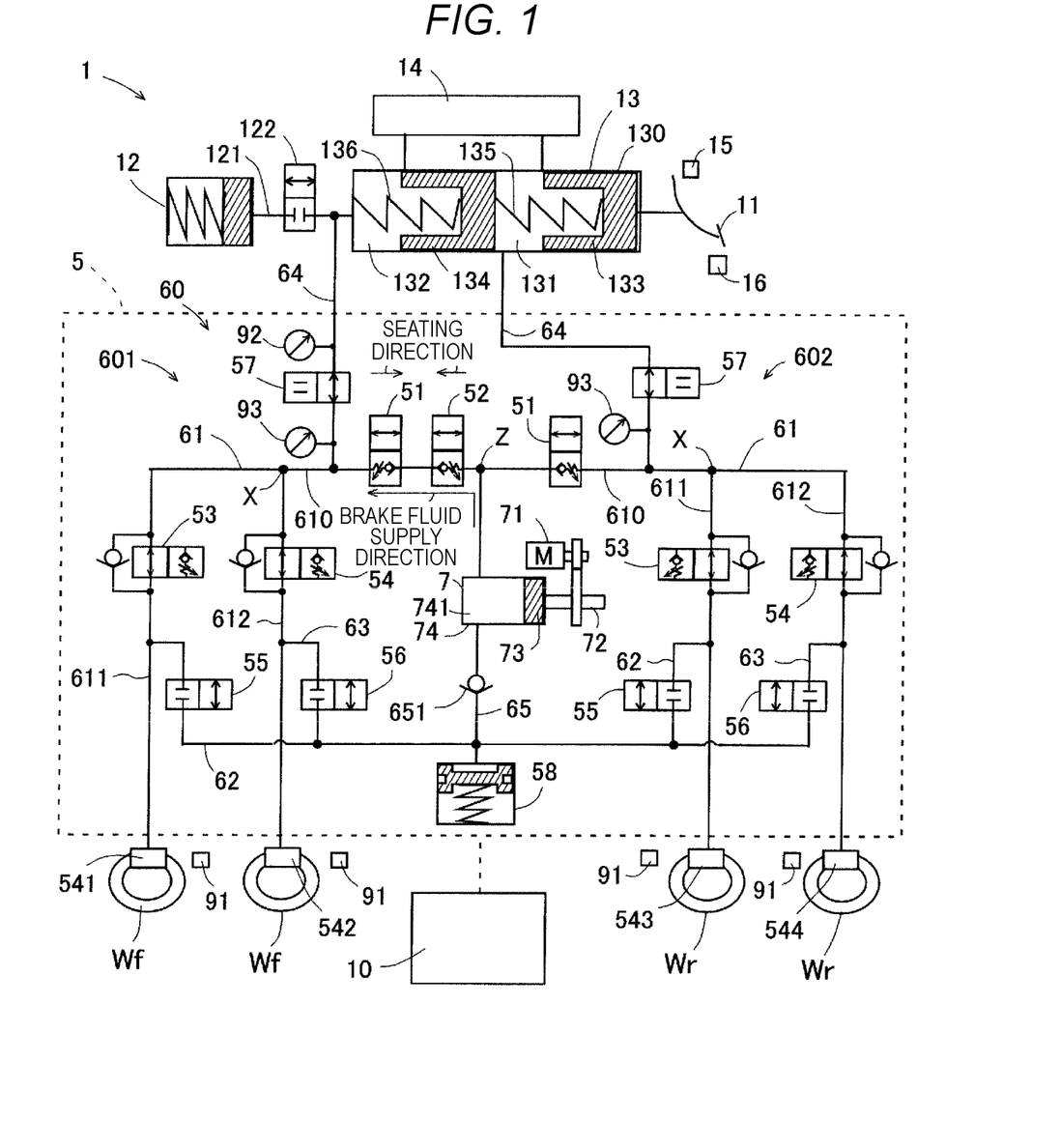
FIG. 1 is a configuration diagram of a vehicle braking device according to the present embodiment.

Hereinafter, an embodiment will be described with reference to the drawings. The drawings used in the description are conceptual diagrams. A vehicle braking device 1 according to the present embodiment includes a brake pedal 11, a stroke simulator 12, a master cylinder unit 13, a reservoir 14, a brake switch 15, a stroke sensor 16, an actuator 5, and a brake ECU 10.

The brake pedal 11 is an operating member on which a driver can perform a brake operation. The brake switch 15 is a sensor that detects presence or absence of an operation on the brake pedal 11. The stroke sensor 16 is a sensor that detects a pedal stroke of the brake pedal 11 (hereinafter, referred to as "stroke"). The brake switch 15 and the stroke sensor 16 output a detection signal to the brake ECU 10.

The stroke simulator 12 is a device that generates a reaction force corresponding to an operation on the brake pedal 11. The stroke simulator 12 is connected to a master cylinder 130 via a liquid path 121. A simulator cut valve 122 is provided on the liquid path 121. The simulator cut valve 122 is a normally-closed type electromagnetic valve that is closed in a non-energized state. Normally, the simulator cut valve 122 is maintained in an open state, and brake fluid flowing out of the master cylinder 130 is supplied to the stroke simulator 12 via the liquid path 121. Normally, a master cut valve 57 to be described later is closed.

The master cylinder unit (corresponding to a "second supply device") 13 is a device that generates a master pressure corresponding to an operation on the brake pedal 11. Specifically, the master cylinder unit 13 includes a master cylinder 130, a first master piston 133, and a second master piston 134.

The master cylinder 130 is a cylinder member and includes a first master chamber 131 and a second master chamber 132 that generate a master pressure corresponding to an operation on the brake pedal 11. The master cylinder unit 13 is configured such that the same hydraulic pressure is formed in the first master chamber 131 and the second master chamber 132. The first master chamber 131 is defined by the first master piston 133 and the second master piston 134. The second master chamber 132 is defined by the second master piston 134 and a bottom portion of the master cylinder 130. The first master piston 133 and the second master piston 134 move according to an operation on the brake pedal 11. Accordingly, the hydraulic pressures of the master chambers 131 and 132 (hereinafter, referred to as "master pressure") fluctuate. The second master chamber 132 communicates with the stroke simulator 12 via the liquid path 121.

A first spring 135 is provided between the first master piston 133 and the second master piston 134. A second spring 136 is provided between the second master piston 134 and the bottom portion of the master cylinder 130. The reservoir 14 stores the brake fluid. The brake fluid stored in the reservoir 14 is supplied to the master cylinder 130 (master chambers 131 and 132). A flow path between the reservoir 14 and the master cylinder 130 communicates before the master pistons 133 and 134 move forward by a predetermined amount, and is shut off when the master pistons 133 and 134 move forward by the predetermined amount or more.

The actuator 5 is a device that adjusts a hydraulic pressure (hereinafter, also referred to as a "wheel pressure") of each of wheel cylinders 541, 542, 543, and 544. The actuator 5 is disposed between the master cylinder unit and the wheel cylinders 541 to 544. The actuator 5 adjusts each wheel pressure in response to an instruction of the brake ECU 10. For example, disc brake devices or drum brake devices (not shown) provided on wheels Wf and Wr are driven according to the wheel pressures, and a braking force is generated on each of the wheels Wf and Wr.

The actuator 5 executes a pressurization control for pressurizing wheel pressures, a pressure reduction control for reducing wheel pressures, or a maintaining control for maintaining wheel pressures in response to an instruction from the brake ECU 10 (for example, according to the stroke of the brake pedal 11). The actuator 5 executes, for example, an anti-skid control (also referred to as ABS control), a sideslip prevention control (ESC control), or the like based on an instruction of the brake ECU 10.

In detail, the actuator 5 includes a hydraulic circuit 60 and a supply device 7 (corresponding to a "first supply device"). The hydraulic circuit 60 includes a first piping system 601 connected to the wheel cylinders 541 and 542 of the front wheels Wf, and a second piping system 602 connected to the wheel cylinders 543 and 544 of the rear wheels Wr. The wheel cylinders 541 and 542 of the front wheels Wf can be referred to as first wheel cylinders, and the wheel cylinders 543 and 544 of the rear wheels Wr can referred to as second wheel cylinders. A wheel speed sensor 91 is provided for each of the wheels Wf and Wr. The hydraulic circuit 60 corresponds to a brake circuit.

First, the first piping system 601 (see a left side of a branch point Z in FIG. 1) will be described. The first piping system 601 includes a first supply path 61, a first electromagnetic valve 51, a second electromagnetic valve 52, holding valves 53 and 54, pressure reduction flow paths 62 and 63, pressure reduction valves 55 and 56, a second supply path 64, the master cut valve 57, and a pressure regulating reservoir 58. The terms of flow path and supply path in the description can be replaced with liquid path, pipeline, oil path, and the like.

The first supply path 61 is a flow path connecting the supply device 7 and the wheel cylinders 541 and 542. At a branch point X, the first supply path 61 branches into a flow path 611 connected to the wheel cylinder 541 and a flow path 612 connected to the wheel cylinder 542. That is, the first supply path 61 includes the flow paths 611 and 612, and a flow path 610 connecting the supply device 7 and the branch point X.

The first electromagnetic valve 51 and the second electromagnetic valve 52 are normally-closed type electromagnetic valves provided on the flow path 610 of the first supply path 61. The second electromagnetic valve 52 is disposed between the first electromagnetic valve 51 and the supply device 7. Details of the first electromagnetic valve 51 and the second electromagnetic valve 52 will be described later.

The holding valve 53 is a normally-open type electromagnetic valve that is provided on the flow path 611 of the first supply path 61 and that is opened in a non-energized state. The holding valve 54 is a normally-open type electromagnetic valve that is provided on the flow path 612 of the first supply path 61. The pressure reduction flow path 62 is a flow path that connects the pressure regulating reservoir 58 and a portion of the flow path 611 between the holding valve 53 and the wheel cylinder 541. The pressure reduction flow path 63 is a flow path that connects the pressure regulating reservoir 58 and a portion of the flow path 612 between the holding valve 54 and the wheel cylinder 542. The pressure reduction valve 55 is a normally-closed type electromagnetic valve provided on the pressure reduction flow path 62. The pressure reduction valve 56 is a normally-closed type electromagnetic valve provided on the pressure reduction flow path 63.

The second supply path 64 is a flow path that connects the master cylinder unit 13 (second master chamber 132) and the first supply path 61. The second supply path 64 connects the master cylinder unit 13 and portions of the flow path 610 of the first supply path 61 closer to the wheel cylinders 541 and 542 than to the first electromagnetic valve 51 and the second electromagnetic valve 52 (portions closer to the wheel cylinders 541 and 542). In more detail, the second supply path 64 connects the master cylinder unit 13 and a portion of the first supply path 61 between the first electromagnetic valve 51 and the branch point X.

The master cut valve 57 is a normally-open type electromagnetic valve provided on the second supply path 64. The second supply path 64 is provided with a pressure sensor 92 that detects a master pressure and a pressure sensor 93 that detects the hydraulic pressure of the wheel cylinders 541 and 542. The pressure sensor 93 of the second piping system 602 detects the hydraulic pressure of the wheel cylinders 543 and 544.

The pressure regulating reservoir 58 is a reservoir including a piston and a spring. The pressure regulating reservoir 58 is connected to the supply device 7 via a flow path 65 and a check valve 651 provided on the flow path 65. The pressure regulating reservoir 58 is configured to store the brake fluid flowing out of the wheel cylinders 541 to 544 at the time of pressure reduction, and to supply the brake fluid to the supply device 7. Since the second piping system 602 has the same configuration as the first piping system 601 except that the second electromagnetic valve 52 and the pressure sensor 92 are not disposed, the same reference numerals are given and the description thereof will be omitted. In the present embodiment, the supply device 7 and the pressure regulating reservoir 58 are commonly disposed in both the piping systems 601 and 602. Further, a portion of the first supply path 61 from the supply device 7 to the branch point Z is constituted by a flow path common to both the piping systems 601 and 602.

The supply device 7 is a device that supplies the brake fluid to connection destinations including the wheel cylinders 541 and 542 (all the wheel cylinders 541 to 544 in the present embodiment) via the first supply path 61. As an example, the supply device 7 is an electric cylinder that includes a motor 71, a linear motion mechanism 72, a piston 73, and a cylinder 74. The motor 71 is a power source for the linear motion mechanism 72 and the piston 73.

The linear motion mechanism 72 is a mechanism that converts a rotational movement of an output shaft of the motor 71 into a linear movement of the piston 73. The linear motion mechanism 72 includes, for example, a gear and a ball screw. The piston 73 is slidably disposed in the cylinder 74, and moves forward or backward in conjunction with the linear movement of the linear motion mechanism 72. An inside of the cylinder 74 forms a hydraulic chamber 741 which generates a hydraulic pressure corresponding to the movement of the piston 73. The hydraulic chamber 741 is connected to the first supply path 61 and the flow path 65. When the piston 73 moves forward, the brake fluid is supplied from the hydraulic chamber 741 to the first supply path 61, and when the piston 73 moves backward, the brake fluid is supplied from the pressure regulating reservoir 58 and/or the first supply passage 61 to the hydraulic pressure chamber 741.

Thus, the vehicle braking device 1 of the present embodiment includes the supply device 7, the first supply path 61, the first electromagnetic valve 51, and the second electromagnetic valve 52. Further, the vehicle braking device 1 further includes the master cylinder unit 13 that is a device different from the supply device 7 and supplies the brake fluid to the connection destinations including the wheel cylinders 541 and 542 (all the wheel cylinders 541 to 544 in the present embodiment), and the second supply path 64. The first electromagnetic valve 51 and the second electromagnetic valve 52 are closed, for example, when the brake fluid is supplied from the master cylinder unit 13 to the wheel cylinders 541 and 542. The vehicle braking device 1 further includes the brake ECU 10 that is a control unit for controlling the supply device 7, the first electromagnetic valve 51, and the second electromagnetic valve 52.

The brake ECU 10 is an electronic control unit including a CPU, a memory, and the like. Specifically, the brake ECU 10 is a device that includes one or a plurality of processors and executes various controls by the processors. The brake switch 15, various sensors such as the stroke sensor 16, the pressure sensors 92 and 93 and the wheel speed sensor 91 are connected to the brake ECU 10 by communication lines (not shown). The brake ECU 10 controls the actuator 5 and the electromagnetic valves based on detection results of these various sensors. The brake ECU 10 controls the motor 71 of the supply device 7 and adjusts the supply of the brake fluid to the wheel cylinders 541 to 544.

Normally, the brake ECU 10 adjusts the wheel pressures by the actuator 5 in a state where the simulator cut valve 122 is opened and the master cut valve 57 is closed. The brake ECU 10 sets a target wheel pressure (required deceleration) based on the stroke and/or the master pressure. The brake ECU 10 controls the actuator 5 in order to make the wheel pressures reach the target wheel pressure.

For example, when a failure occurs in an electrical system, the electromagnetic valves are in the non-energized state, the simulator cut valve 122 is closed, the master cut valve 57 is opened, the holding valves 53 and 54 are opened, and the pressure reduction valves 55 and 56 are closed. Hereinafter, this state is referred to as a non-energized mode. In the non-energized mode, the actuator 5 being not operated, a master pressure is efficiently generated by a driver operating the brake pedal 11, and the master pressure is supplied to the wheel cylinders 541 to 544.

(First Electromagnetic Valve and Second Electromagnetic Valve)

Figure 2:
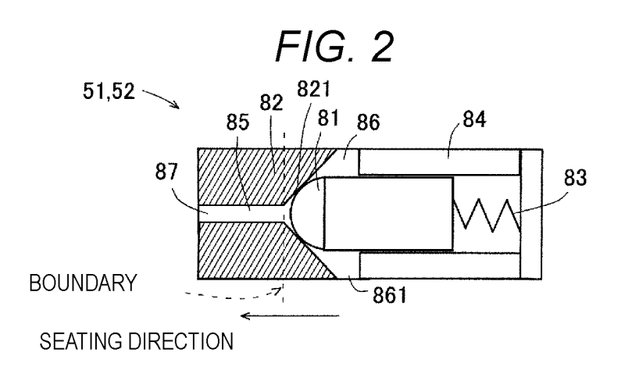
FIG. 2 is a conceptual diagram illustrating configurations of a first electromagnetic valve and a second electromagnetic valve according to the present embodiment.

First, a configuration of the normally-closed type electromagnetic valve (linear solenoid valve) such as the first electromagnetic valve 51 and the second electromagnetic valve 52 will be described. Since a configuration of an electromagnetic valve is well known, the configuration will be described conceptually and detailed description will be omitted.

As shown in FIG. 2, the first electromagnetic valve 51 and the second electromagnetic valve 52 (hereinafter, also referred to as the "electromagnetic valves 51 and 52") each include a valve body 81, a valve seat 82, a biasing member 83, and a solenoid portion 84. The valve body 81 includes, for example, a plunger (movable core) and is driven by applying a current to the solenoid portion 84. The valve seat 82 is a member in which a tapered valve seat surface 821 is formed on an end on the valve body 81 side, and a flow path 85 is formed in a central portion. The valve seat 82 is configured such that the flow path 85 is closed when the valve body 81 abuts against an entire circumference of the valve seat surface 821.

The biasing member 83 is a spring that biases the valve body 81. The biasing member 83 of the present embodiment biases the valve body 81 toward the valve seat 82. When a current is applied, the solenoid portion 84 applies an electromagnetic force to the valve body 81 in a direction away from the valve seat surface 821 (direction against a biasing force of the biasing member 83). When this electromagnetic force is larger than a sum of the biasing force and a force applied due to a differential pressure, the electromagnetic valves 51 and 52 are opened. The force applied to the valve body 81 due to the differential pressure is in the same direction (+) as the biasing force or in an opposite direction (−) to the biasing force.

The biasing force of the biasing member 83 has a maximum value (maximum biasing force) when no current is applied. When a force (force applied due to the differential pressure) which is in the opposite direction to the biasing force and is larger than the maximum biasing force is applied to the valve body 81, even in a state where no current is applied to the electromagnetic valve, the valve body 81 is separated from the valve seat 82 and the electromagnetic valve is opened. A differential pressure corresponding to the maximum biasing force, that is, a maximum differential pressure (differential pressure in the opposite direction to the biasing force) under which the valve-closing in the non-energized state can be maintained is set as a "differential pressure resistance".

With a virtual plane including an inner circumferential edge of the valve seat surface 821 as a boundary, an inside of each of the electromagnetic valves 51 and 52 is partitioned into a valve body chamber 86 which is a region on a side where the valve body 81 is disposed, and a non-valve body chamber 87 which is a region on a side where the valve body 81 is not disposed. The valve body 81 and the biasing member 83 are disposed in the valve body chamber 86. The valve body chamber 86 includes a region on a back surface side of the valve body 81, that is, a region in which the biasing member 83 is disposed. Further, one or a plurality of ports 861 connected to an external flow path (first supply path 61) are formed in the valve body chamber 86. The non-valve body chamber 87 is configured with the flow path 85. The flow path 85 is connected to the external flow path (first supply path 61).

When a hydraulic pressure in the valve body chamber 86 is higher than a hydraulic pressure in the non-valve body chamber 87, a direction of the force applied to the valve body 81 due to the differential pressure is a direction in which the valve body 81 is pressed against the valve seat surface 821. On the other hand, when the hydraulic pressure in the non-valve body chamber 87 is higher than the hydraulic pressure in the valve body chamber 86, the direction of the force applied to the valve body 81 due to the differential pressure is a direction in which the valve body 81 is separated from the valve seat surface 821.

As a normal operation, when there is no differential pressure between the valve body chamber 86 and the non-valve body chamber 87 and no current is applied to the electromagnetic valves 51 and 52, no electromagnetic force is generated in the solenoid portion 84, and the valve body 81 is seated on the valve seat surface 821 by the biasing force of the biasing member 83. That is, in such a case, the flow path 85 is closed, and the valve body chamber 86 and the non-valve body chamber 87 are blocked from each other. On the other hand, when a predetermined current is applied to the electromagnetic valves 51 and 52, a predetermined electromagnetic force is generated, and the valve body 81 is driven against the biasing force and separated from the valve seat surface 821. That is, in such a case, the flow path 85 is opened, and the valve body chamber 86 and the non-valve body chamber 87 communicate with each other.

Next, disposition directions of the electromagnetic valves 51 and 52 will be described. In the description, the direction in which the valve body 81 is seated in the valve seat 82 is set as a "seating direction". In other words, the seating direction can be said to be a flow direction of the brake fluid from the valve body chamber 86 to the non-valve body chamber 87. In still other words, the seating direction can be said to be a direction in which the valve body 81 faces the valve seat 82, that is, a direction in which the valve is closed. The seating direction of the present embodiment can also be said to be a direction in which the biasing member 83 biases the valve body 81. A direction in which the brake fluid flows from the supply device 7 to the wheel cylinders 541 and 542 through the first supply path 61 is set as a "brake fluid supply direction".

The first electromagnetic valve 51 is disposed on the first supply path 61 such that the seating direction of the first electromagnetic valve 51 and the brake fluid supply direction are opposite to each other. The second electromagnetic valve 52 is disposed on the first supply path 61 such that the seating direction of the second electromagnetic valve 52 and the brake fluid supply direction are the same. In other words, the first electromagnetic valve 51 and the second electromagnetic valve 52 are disposed such that the seating directions thereof are different from each other with respect to a one-way flow of the brake fluid flowing through the first supply path 61. In still other words, in the first electromagnetic valve 51, the valve body chamber 86 is disposed downstream of the non-valve body chamber 87 in the brake fluid supply direction, and in the second electromagnetic valve 52, the valve body chamber 86 is disposed upstream of the non-valve body chamber 87 in the brake fluid supply direction.

The flow path 610 of the first supply path 61 includes a flow path connecting the branch point X and the valve body chamber 86 of the first electromagnetic valve 51, a flow path connecting the non-valve body chamber 87 of the first electromagnetic valve 51 and the non-valve body chamber 87 of the second electromagnetic valve, and a flow path connecting the valve body chamber 86 of the second electromagnetic valve 52 and the supply device 7. Accordingly, the seating directions of the electromagnetic valves 51 and 52 in the first supply path 61 are opposite to each other. The disposition positions of the first electromagnetic valve 51 and the second electromagnetic valve 52 may be exchanged. That is, the flow path 610 of the first supply path 61 may include a flow path connecting the branch point X and the non-valve body chamber 87 of the second electromagnetic valve 52, a flow path connecting the valve body chamber 86 of the second electromagnetic valve 52 and the valve body chamber 86 of the first electromagnetic valve 51, and a flow path connecting the non-valve body chamber 87 of the first electromagnetic valve 51 and the supply device 7. Therefore, the two electromagnetic valves 51 and 52 having different seating directions are disposed in series in the first supply path 61 of the first piping system 601.

In the second piping system 602, the second electromagnetic valve 52 is not provided, and the first electromagnetic valve 51 is disposed on the first supply path 61. In the second piping system 602, the non-valve body chamber 87 of the first electromagnetic valve 51 is connected to the supply device 7, and the valve body chamber 86 of the first electromagnetic valve 51 is connected to the wheel cylinders 543 and 544.

Effect of the Present Embodiment

When the first supply path 61 is shut off while the supply device 7 is in operation, the electromagnetic valves 51 and 52 are closed. Here, according to the present embodiment, when the supply device 7 supplies the brake fluid toward the wheel cylinders 541 and 542, the direction of the force applied to the second electromagnetic valve 52 due to the differential pressure (hydraulic pressure) is the seating direction, that is, a direction in which the valve is closed. That is, since the brake fluid applies a force in the same direction as the biasing force of the biasing member 83, at least the second electromagnetic valve 52 can reliably shut off the first supply path 61 regardless of the magnitude of the differential pressure. As compared to an increase in size of the electromagnetic valve in order to increase the differential pressure resistance of the electromagnetic valve, providing two electromagnetic valves is advantageous in terms of cost because the increase in size of the device can be prevented and existing electromagnetic valves can be used. Therefore, according to the present embodiment, it is possible to reliably disconnect the supply device 7 and the wheel cylinders 541 and 542 while preventing the increase in size of the device.

Further, in the non-energized mode such as when a failure occurs in the electrical system, the master pressure is supplied to the wheel cylinders 541 to 544 according to a brake operation of the driver. At this time, due to the differential pressure, the force is applied to the first electromagnetic valve 51 in the same direction as the seating direction (direction in which the valve is closed) in both the piping system 601 and the piping system 602. Accordingly, when the master pressure is supplied to the wheel cylinders 541 to 544, the flow path between the second supply path 64 and the supply device 7 is reliably shut off. That is, the brake fluid is prevented from flowing into the supply device 7, and the wheel pressure is efficiently pressurized.

Thus, in a configuration in which the vehicle braking device 1 includes the master cylinder unit 13 and the second supply path 64, even if the hydraulic pressure on a supply device 7 side or a wheel cylinders 541 to 544 side is increased, a target flow path can be reliably shut off since either the first electromagnetic valve 51 or the second electromagnetic valve 52 always receives a force in the seating direction.

(Control Example at the Time of Failure Detection)

Here, a control when a liquid leakage failure occurs in the first piping system 601 which is a system for the front wheels Wf will be described. A liquid leakage failure of the first piping system 601 or the second piping system 602 can be detected by the pressure sensor 93. For example, in spite of the pressurization of all the wheel pressures by the actuator 5, when a detection value of the pressure sensor 93 of the second piping system 602 and/or the pressure sensor of the first piping system 601 does not reach a predetermined value, the electromagnetic valves 51 and 52 of the first piping system 601 and the first electromagnetic valve 51 of the second piping system 602 are closed. When only the detection value of the pressure sensor 93 of the first piping system 601 decreases, it can be inferred that the liquid leakage occurs in the first piping system 601.

When the liquid leakage failure of the first piping system 601 is detected, the brake ECU 10 closes the electromagnetic valves 51 and 52 of the first piping system 601 and opens the first electromagnetic valve 51 of the second piping system 602. Then, the brake ECU 10 supplies the brake fluid only to the second piping system 602 by the supply device 7. Here, since the second piping system 602 is a system for the rear wheels Wr, the wheel pressure required for the required deceleration is relatively increased. Generally, due to a configuration of a vehicle, the braking forces of the rear wheels Wr have a smaller influence on the deceleration than the braking forces of the front wheels Wf. That is, when the required deceleration is achieved only by the braking forces of the rear wheels Wr, a higher wheel pressure is required as compared with when the required deceleration is achieved only by the braking forces of the front wheels Wf.

Therefore, when the liquid leakage in the first piping system 601 is detected, the brake ECU 10 is configured to set the target wheel pressure of the rear wheels Wr relatively high and achieve a high wheel pressure with respect to the wheel cylinders 543 and 544. Since the high wheel pressure is generated in the rear wheels Wr, the differential pressure between the wheel pressure of the front wheels Wf and the wheel pressure of the rear wheels Wr becomes large. Here, according to the present embodiment, even though the differential pressure becomes large, the brake fluid can be reliably prevented from flowing out to the first piping system 601 by providing the second electromagnetic valve 52 on the first supply path 61 of the first piping system 601.

If the second electromagnetic valve 52 is not provided in the first piping system 601, when the liquid leakage failure occurs in the first piping system 601, a wheel pressure higher than the differential pressure resistance of the first electromagnetic valve 51 cannot be generated in the wheel cylinders 543 and 544 by the first supply device. Further, in a case where the second electromagnetic valve 52 is not provided and the first electromagnetic valve 51 is disposed on the first supply path 61 with the seating direction thereof reversed, when the brake fluid flows in a direction opposite to the brake fluid supply direction at the time of occurrence of a failure in the electrical system (non-energized mode), a force acts on the first electromagnetic valve 51 in a direction in which the valve is opened. When the first electromagnetic valve 51 is opened, the brake fluid flows out to the supply device 7 side. That is, in consideration of a response to the case when a failure occurs in the electrical system, according to a configuration of the related art, it is necessary to increase the differential pressure resistance of the first electromagnetic valve 51 in order to generate a high wheel pressure, which causes an increase in sizes of the electromagnetic valve and the device. However, according to the configuration of the present embodiment, the second electromagnetic valve 52 having a different seating direction from that of the first electromagnetic valve 51 is provided, and the target flow path can be reliably shut off regardless of the direction and magnitude of the force applied due to the differential pressure.

Further, for example, in order to achieve the predetermined required deceleration, the wheel pressure required when the braking force is generated only on the rear wheels Wr is about 3 times to 4 times the wheel pressure required when the braking force is generated only on the front wheels Wf. That is, when the target flow path is shut off by one electromagnetic valve, the differential pressure resistance of the electromagnetic valve is also correspondingly large, and the size of the electromagnetic valve is also correspondingly large. However, according to the present embodiment, the increase in size of the device is prevented, and manufacturing and development costs are also reduced as long as two electromagnetic valves (for example, existing and general-purpose electromagnetic valves) are provided such that seating directions thereof are different.

When a liquid leakage failure of the second piping system 602 is detected, the brake ECU 10 closes the first electromagnetic valve 51 of the second piping system 602 and opens the electromagnetic valves 51 and 52 of the first piping system 601. Then, the brake fluid is supplied from the supply device 7 only to the first piping system 601 by a relatively low target wheel pressure. Since the target wheel pressure of the front wheels Wf is relatively low, it is sufficient that the differential pressure resistance of the first electromagnetic valve 51 of the second piping system 602 is small. That is, an existing electromagnetic valve can be used for the first electromagnetic valve 51 of the second piping system 602.

(Operation Check Control)

Figure 3:
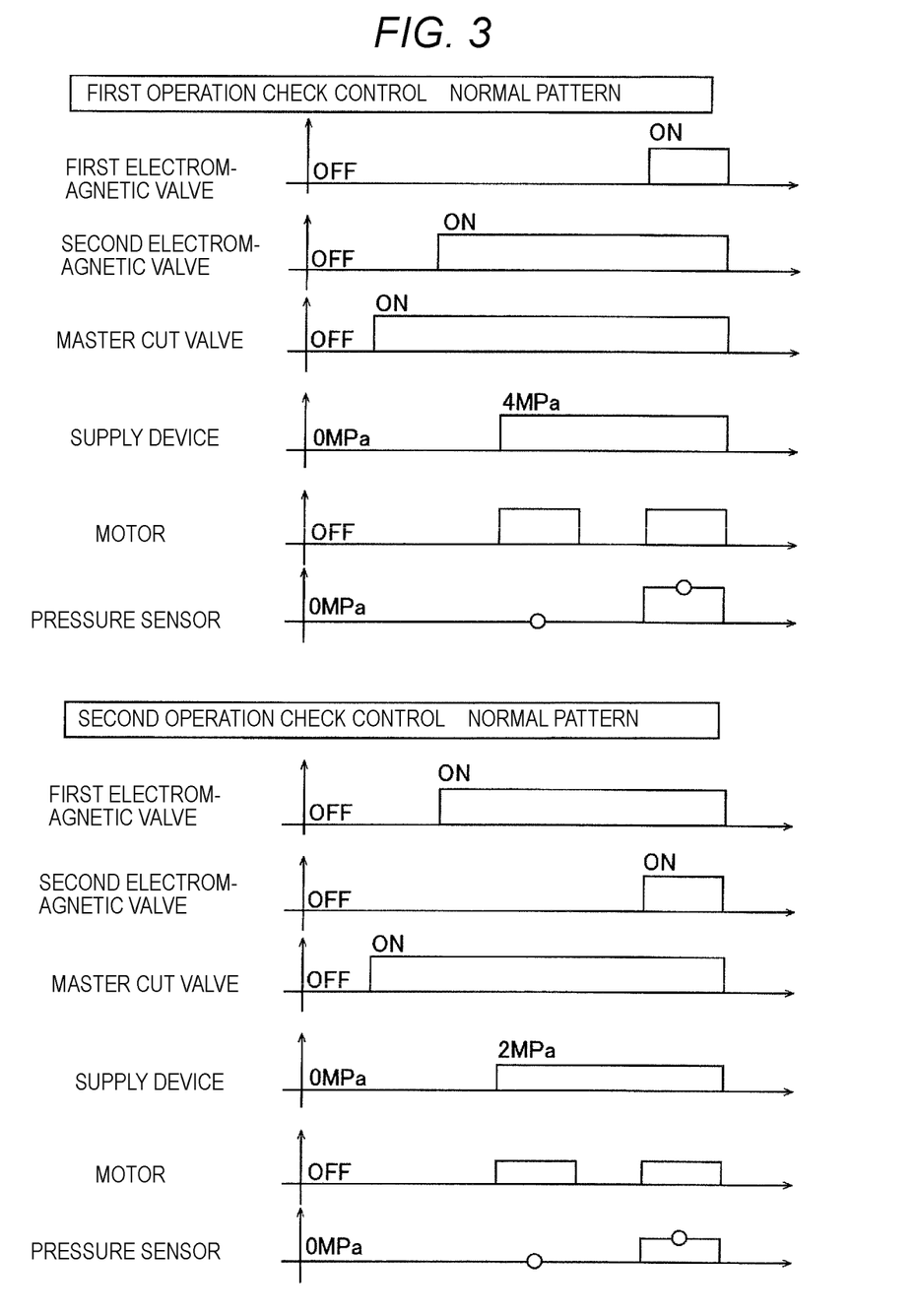
FIG. 3 is a time chart illustrating operation check controls according to the present embodiment.

The brake ECU (corresponding to the "control unit") 10 executes operation check controls on the electromagnetic valves 51 and 52 of the first piping system 601 at a predetermined timing. In detail, the brake ECU 10 executes a first operation check control which is an operation check control for the first electromagnetic valve 51 and a second operation check control which is an operation check control for the second electromagnetic valve 52 in order at the predetermined timing. FIG. 3 shows an example of such a case where the first electromagnetic valve 51 and the second electromagnetic valve 52 are determined to be normal in the first operation check control and the second operation check control. In the following description, FIG. 3 can be referred to as appropriate.

As the first operation check control, the brake ECU 10 closes the two master cut valves 57, closes the first electromagnetic valves 51 and opens the second electromagnetic valves 52 of both piping systems 601 and 602. Then, the brake ECU 10 sets the target wheel pressure to a value less than the differential pressure resistance of the first electromagnetic valve 51 (first predetermined pressure), and operates the supply device 7. When the supply device 7 supplies an amount of the brake fluid corresponding to the first predetermined pressure to the first supply path 61, the brake ECU 10 stops the brake fluid supply performed by the supply device 7.

The brake ECU 10 determines whether or not the valve-closing of the first electromagnetic valve 51 of the first piping system 601 is normal based on the detection value of the pressure sensor 93 of the first piping system 601. When the detection value of the pressure sensor 93 does not fluctuate (for example, when the detection value is less than or equal to the predetermined value), it can be estimated that the target flow path is shut off, and thus the brake ECU 10 determines that the valve-closing of the first electromagnetic valve 51 is normal.

On the other hand, when the detection value of the pressure sensor 93 exceeds the predetermined value, it can be estimated that the target flow path is not shut off, and thus the brake ECU 10 determines that the valve-closing of the first electromagnetic valve 51 is abnormal. For example, the determination of normality is performed after the operation of the supply device 7 is completed, and the determination of abnormality is performed during the operation of the supply device 7 or after the operation is completed. Therefore, according to the first operation check control, it is possible to check a sealing function of the first electromagnetic valve 51 against a force in the opposite direction to the seating direction. The first operation check control may be executed by a method other than this method. For example, the first electromagnetic valve 51 is closed after the supply device 7 supplies the brake fluid to the wheel cylinders. Subsequently, when the supply device 7 is operated so as to suck the brake fluid and the detection value of the pressure sensor 93 does not decrease, it may be determined that the first electromagnetic valve 51 is normal.

After it is determined that the sealing function of the first electromagnetic valve 51 is normal, the brake ECU 10 maintains or reduces the target wheel pressure and opens the first electromagnetic valve 51. Then, the brake ECU 10 determines whether or not a valve opening operation of the first electromagnetic valve 51 of the first piping system 601 is normal based on the detection value of the pressure sensor 93 of the first piping system 601. When the detection value of the pressure sensor 93 is equal to or higher than the predetermined value (for example, when the detection value is a value corresponding to the target wheel pressure), it can be estimated that the brake fluid is supplied, and thus the brake ECU 10 determines that the valve opening operation of the first electromagnetic valve 51 is normal. On the other hand, when the detection value of the pressure sensor 93 is less than the predetermined value, it can be estimated that the brake fluid is not supplied, and thus the brake ECU 10 determines that the valve opening operation of the first electromagnetic valve 51 is abnormal. Therefore, according to the first operation check control, it is possible to check a valve opening function of the first electromagnetic valve 51.

As the second operation check control, the brake ECU 10 closes the two master cut valves 57, closes the second electromagnetic valves 52, opens the first electromagnetic valve 51 of the first piping system 601, and closes the first electromagnetic valve 51 of the second piping system 602. Then, the brake ECU 10 sets the target wheel pressure to a minute value (for example, a value smaller than the value at the time of the operation check control for the first electromagnetic valve 51), and operates the supply device 7. When the amount of the brake fluid corresponding to the target wheel pressure is supplied to the first supply path 61, the supply device 7 stops the supply of the brake fluid. Since the direction of the force applied due to the differential pressure and the seating direction are the same, it is sufficient to check the sealing function by generating a minute pressure (second predetermined pressure) by the supply device 7.

The brake ECU 10 determines whether or not the valve-closing of the second electromagnetic valve 52 is normal based on the detection value of the pressure sensor 93 of the first piping system 601. When the detection value of the pressure sensor 93 does not fluctuate (for example, when the detection value is less than or equal to the predetermined value), it can be estimated that the target flow path is shut off, and thus the brake ECU 10 determines that the valve-closing of the second electromagnetic valve 52 is normal. On the other hand, when the detection value of the pressure sensor 93 exceeds the predetermined value, it can be estimated that the target flow path is not shut off, and thus the brake ECU 10 determines that the valve-closing of the second electromagnetic valve 52 is abnormal. For example, the determination of normality is performed after the operation of the supply device 7 is completed, and the determination of abnormality is performed during the operation of the supply device 7 or after the operation is completed. Therefore, according to the second operation check control, it is possible to check a sealing function of the second electromagnetic valve 52 against a force in the seating direction.

For example, after it is determined that the sealing function of the second electromagnetic valve 52 is normal, the brake ECU 10 maintains or reduces the target wheel pressure and opens the second electromagnetic valve 52. Then, the brake ECU 10 determines whether or not a valve opening operation of the second electromagnetic valve 52 is normal based on the detection value of the pressure sensor 93 of the first piping system 601. When the detection value of the pressure sensor 93 is equal to or higher than the predetermined value (for example, when the detection value is a value corresponding to the target wheel pressure), it can be estimated that the brake fluid is supplied, and thus the brake ECU 10 determines that the valve opening operation of the second electromagnetic valve 52 is normal. On the other hand, when the detection value of the pressure sensor 93 is less than the predetermined value, it can be estimated that the brake fluid is not supplied, and thus the brake ECU 10 determines that the valve opening operation of the second electromagnetic valve 52 is abnormal. Therefore, according to the second operation check control, it is possible to check a valve-opening function of the second electromagnetic valve 52. The master cut valve 57 may be opened while the supply device 7 is not in operation in order to prevent remaining of the wheel pressure after the first operation check control and the second operation check control.

These operation check controls are executed at the predetermined timing, for example, a timing when a driver is not in a vehicle, a timing when the vehicle is stopped by a force other than a hydraulic braking force after a predetermined time has passed since an ignition is turned off, or a timing when the driver is stepping on an accelerator pedal (the vehicle is running). Since the operation check control can be executed with a small hydraulic pressure (for example, a hydraulic pressure at which almost no braking force is generated) and in a short time, the operation check control can be executed even while the vehicle is running. Further, since the operation check control is performed by closing the master cut valve 57, no influence on reaction force generation with respect to the brake operation occurs.

In overview, the first operation check control includes a first supply processing, a first valve-closing determination processing, and a first valve-opening determination processing. The first supply processing is a processing of closing the first electromagnetic valve 51, opening the second electromagnetic valve 52, and operating the supply device 7 so as to supply such an amount of the brake fluid to the first supply path 61 that the hydraulic pressure in the flow path between the first electromagnetic valve 51 and the supply device 7 is the first predetermined pressure less than the differential pressure resistance of the first electromagnetic valve 51 when the valve-closing of the first electromagnetic valve 51 is normal. The first valve-closing determination processing is a processing of determining whether or not the valve-closing of the first electromagnetic valve 51 is normal based on the detection value of the pressure sensor 93 accompanying the execution of the first supply processing. The first valve-opening determination processing is a processing of, when the first supply processing is completed and it is determined that the valve-closing of the first electromagnetic valve 51 is normal in the first valve-closing determination processing, opening the first electromagnetic valve 51, and then determining whether or not the valve-opening of the first electromagnetic valve 51 is normal based on the subsequent detection value of the pressure sensor 93. When the valve-closing of the first electromagnetic valve 51 is abnormal, the first valve-opening determination processing is not executed, and for example, the driver is notified of the abnormality. Further, when the valve-opening of the first electromagnetic valve is abnormal, for example, the driver is notified of the abnormality.

In addition, the second operation check control includes a second supply processing, a second valve-closing determination processing, and a second valve-opening determination processing. The second supply processing is a processing of opening the first electromagnetic valve 51, closing the second electromagnetic valve 52, and operating the supply device 7 so as to supply such an amount of the brake fluid to the first supply path 61 that the hydraulic pressure in the flow path between the second electromagnetic valve 52 and the supply device 7 is the second predetermined pressure (in an example, the second predetermined pressure<the first predetermined pressure). The second valve-closing determination processing is a processing of determining whether or not the valve-closing of the second electromagnetic valve 52 is normal based on the detection value of the pressure sensor 93 accompanying the execution of the second supply processing. The second valve-opening determination processing is a processing of, when the second supply processing is completed and it is determined that the valve-closing of the second electromagnetic valve 52 is normal in the second valve-closing determination processing, opening the second electromagnetic valve 52, and then determining whether or not the valve-opening of the second electromagnetic valve 52 is normal based on the subsequent detection value of the pressure sensor 93. When the valve-closing of the second electromagnetic valve 52 is abnormal, the second valve-opening determination processing is not executed, and for example, the driver is notified of the abnormality. Further, when the valve-opening of the second electromagnetic valve 52 is abnormal, for example, the driver is notified of the abnormality.

The brake ECU 10 may execute only one of the first operation check control and the second operation check control at the predetermined timing. That is, the brake ECU 10 executes at least one of the first operation check control and the second operation check control. The order of execution of the first operation check control and the second operation check control can be set as appropriate. In addition, the second predetermined pressure may be the first predetermined pressure or less, or the first predetermined pressure or more.

Here, when any one of the first electromagnetic valve 51 and the second electromagnetic valve 52 is in a closing abnormality state, the first electromagnetic valve 51, the second electromagnetic valve 52, and the master cut valve 57 are not energized. Accordingly, the first electromagnetic valve 51 and the second electromagnetic valve 52 are closed, and the master cut valve 57 is opened. The brake fluid can be supplied to the wheel cylinders 541 to 544 by operating a second supply device (for example, the master cylinder unit 13) in this state. The closing abnormality is a state in which the electromagnetic valve cannot be opened. In such a case, even if the vehicle braking device 1 is driven in a mode in which the first supply device (for example, the supply device 7) is operated, the brake ECU 10 does not supply the brake fluid from the first supply device to a brake circuit. When any one of the first electromagnetic valve 51 and the second electromagnetic valve 52 is in an opening abnormality state, the first electromagnetic valve 51, the second electromagnetic valve 52, and the master cut valve 57 are energized. Accordingly, the first electromagnetic valve 51 and the second electromagnetic valve 52 are opened, and the master cut valve 57 is closed. The brake fluid can be supplied to the wheel cylinders 541 to 544 by operating the first supply device in this state. The opening abnormality is a state in which the electromagnetic valve cannot be closed. In such a case, even if the vehicle braking device 1 is driven in a mode in which the second supply device is operated, the brake ECU 10 does not supply the brake fluid from the second supply device to the brake circuit. Specifically, the supply of brake fluid from the master cylinder unit 13 (second supply device) to the wheel cylinders 541 to 544 is interrupted by closing the master cut valve 57. In addition, when the second supply device is a device that supplies the brake fluid in response to driving of a motor, the brake ECU 10 does not drive the motor. In an embodiment in which the second supply device and the master cut valves 57 are not provided, the brake fluid can be supplied by the first supply device by opening the first electromagnetic valve 51 and the second electromagnetic valve 52. That is, even when one of the first electromagnetic valve 51 and the second electromagnetic valve 52 cannot be closed, the brake fluid can be supplied.

Further, when the second electromagnetic valve 52 cannot be closed (opening abnormality) and the first electromagnetic valve 51 is in a normal state, the brake fluid supplied from the first supply device acts in a direction of opening the first electromagnetic valve 51. In such a case, the brake fluid is preferably supplied by the master cylinder unit 13 (second supply device) instead of driving the first supply device. Accordingly, it is possible to prevent the brake fluid supplied from the first supply device from flowing to the master cylinder unit 13.

When it is determined by at least one of the first operation check control and the second operation check control that one of the first electromagnetic valve 51 and the second electromagnetic valve 52 is abnormal that the valve cannot be closed, the brake ECU 10 opens the first electromagnetic valve 51 and the second electromagnetic valve 52, and the supply device 7 supplies the brake fluid. Accordingly, the supply device 7 can supply the brake fluid to the wheel cylinders.

Others

Figure 4:
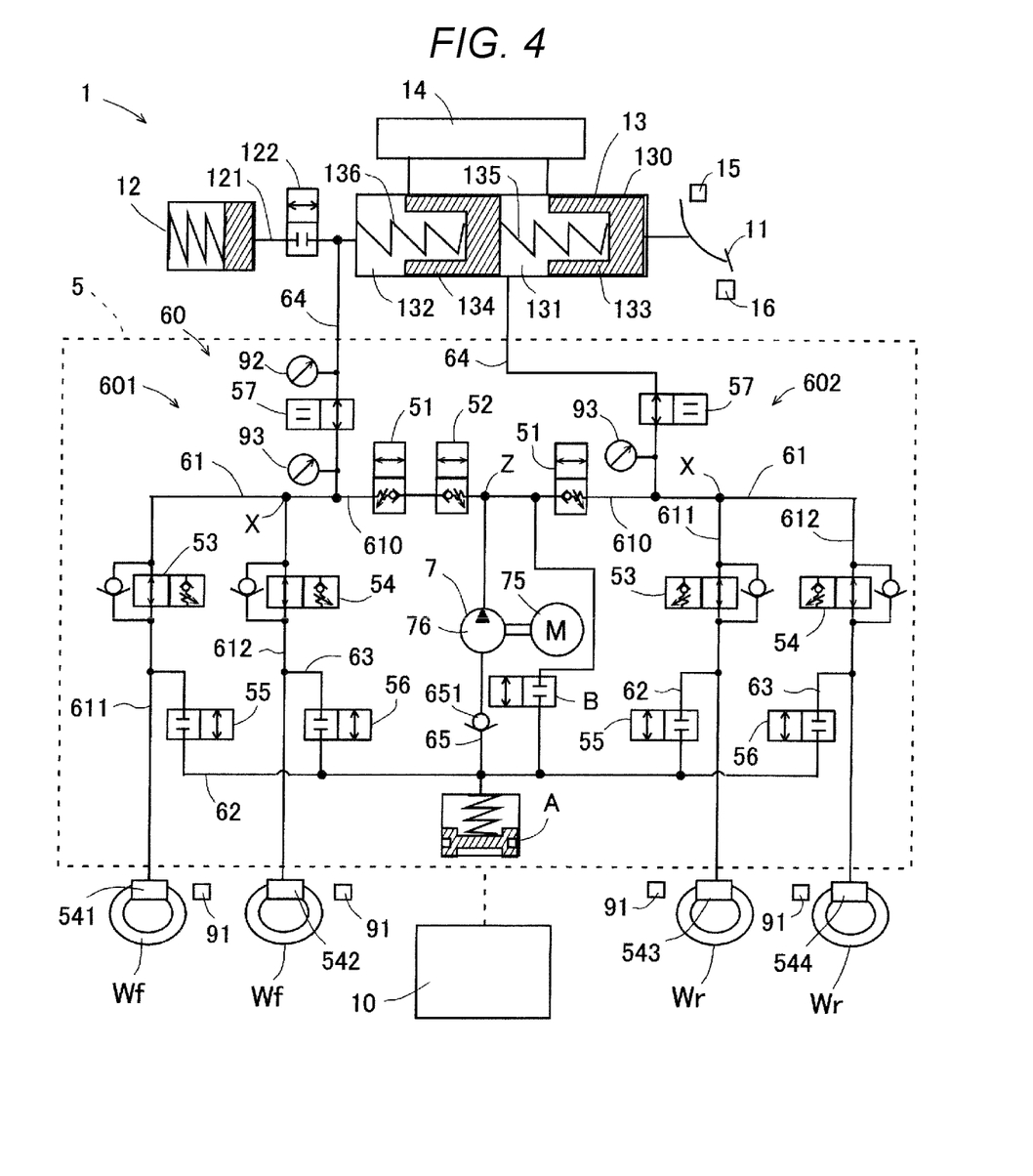
FIG. 4 is a configuration diagram of a modification of the vehicle braking device according to the present embodiment.

The disclosure is not limited to the above-described embodiment. For example, the supply device 7 may be other motor drive devices (for example, an electric pump) instead of the electric cylinder. For example, as shown in FIG. 4, the supply device 7 may be an electric pump and may include a motor 75, a pump 76 operated by a driving force of the motor 75, and a pressure regulating valve B. In such a case, a discharge port of the pump 76 is connected to the first supply path 61, and a suction port is connected to a low pressure reservoir A via the flow path 65. A pressure between the branch point (connection portion) Z and the low pressure reservoir A is adjusted by opening and closing the pressure regulating valve B. The brake fluid is stored in the low pressure reservoir A in advance. The brake ECU 10 drives the motor 75 and the pump 76, and thereby the brake fluid sucked from the low pressure reservoir and discharged by the pump 76 is supplied to the first supply path 61. The same effects as described above can also be achieved by this configuration.

In addition, the second supply device is not limited to the master cylinder unit 13, and may be a motor drive device such as an electric cylinder or an electric pump. Instead of a front-rear piping method as in the above embodiment, the wheel cylinders 541 to 544 may be disposed with respect to the piping systems 601 and 602 in an X piping method in which both the wheel cylinders of the front wheels Wf and the wheel cylinders of the rear wheels Wr are disposed in the piping systems 601 and 602. The front-rear piping is advantageous, for example, when an independent control or a regeneration cooperative control at front and rear wheels is performed in a vehicle equipped with a regeneration braking force generating device. The second electromagnetic valve 52 may be provided not only in the first piping system 601 but also on the first supply path 61 of the second piping system 602. At least one of the first electromagnetic valve 51 and the second electromagnetic valve 52 may be a normally-open type electromagnetic valve. In this case as well, the first electromagnetic valve 51 may be configured such that the seating direction of the valve body of the first electromagnetic valve 51 and the brake fluid supply direction are opposite to each other, and the second electromagnetic valve 52 may be configured such that the seating direction of the valve body of the second electromagnetic valve 52 and the brake fluid supply direction are the same.

The invention claimed is:

1. A vehicle braking device comprising:
a first supply device configured to supply brake fluid to a first wheel cylinder;
a first supply path configured to connect the first supply device and the first wheel cylinder; and
a first electromagnetic valve and a second electromagnetic valve which are provided on the first supply path, wherein
each of the first electromagnetic valve and the second electromagnetic valve includes a valve body, a valve seat, and a biasing member for biasing the valve body,
the first electromagnetic valve is disposed on the first supply path such that a seating direction of the first electromagnetic valve and a brake fluid supply direction are opposite to each other, the seating direction being a direction in which the valve body is seated on the valve seat, the brake fluid supply direction being a direction in which the brake fluid flows from the first supply device to the first wheel cylinder through the first supply path,
the second electromagnetic valve is disposed on the first supply path such that a seating direction of the second electromagnetic valve and the brake fluid supply direction are the same as each other, and
the fluid path between the first electromagnetic valve and the second electromagnetic valve in the first supply path is not connected to the wheel cylinder in the vehicle.

2. The vehicle braking device according to claim 1, further comprising:
a second supply device different from the first supply device and configured to supply the brake fluid to the first wheel cylinder; and
a second supply path configured to connect the second supply device and a portion of the first supply path closer to the first wheel cylinder than to the first electromagnetic valve and the second electromagnetic valve, wherein
the first electromagnetic valve and the second electromagnetic valve are closed when the second supply device supplies the brake fluid to the first wheel cylinder.

3. The vehicle braking device according to claim 2, further comprising:
a pressure sensor configured to detect a hydraulic pressure of the first wheel cylinder; and
a control unit configured to executes at least one of a first operation check control and a second operation check control at a predetermined timing, the first operation check control being an operation check control for the first electromagnetic valve, and the second operation check control being an operation check control for the second electromagnetic valve, wherein the first operation check control includes:
- a first supply processing of closing the first electromagnetic valve, opening the second electromagnetic valve, and operating the first supply device so as to supply such an amount of the brake fluid to the first supply path that a hydraulic pressure in the flow path between the first electromagnetic valve and the first supply device is a first predetermined pressure less than a differential pressure resistance of the first electromagnetic valve when valve-closing of the first electromagnetic valve is normal;
- a first valve-closing determination processing of determining whether or not the valve-closing of the first electromagnetic valve is normal based on a detection value of the pressure sensor accompanying the execution of the first supply processing; and
- a first valve-opening determination processing of, when the first supply processing is completed and it is determined that the valve-closing of the first electromagnetic valve is normal in the first valve-closing determination processing, opening the first electromagnetic valve, and then determining whether or not valve-opening of the first electromagnetic valve is normal based on a detection value of the pressure sensor, and the second operation check control includes:
- a second supply processing of opening the first electromagnetic valve, closing the second electromagnetic valve, and operating the first supply device so as to supply such an amount of the brake fluid to the first supply path that a hydraulic pressure in the flow path between the second electromagnetic valve and the first supply device is a second predetermined pressure when valve-closing of the second electromagnetic valve is normal;
- a second valve-closing determination processing of determining whether or not the valve-closing of the second electromagnetic valve is normal based on a detection value of the pressure sensor accompanying the execution of the second supply processing; and
- a second valve-opening determination processing of, when the second supply processing is completed and it is determined that the valve-closing of the second electromagnetic valve is normal in the second valve-closing determination processing, opening the second electromagnetic valve, and then determining whether or not valve-opening of the second electromagnetic valve is normal based on a detection value of the pressure sensor.

4. The vehicle braking device according to claim 3, wherein
when it is determined by at least one of the first operation check control and the second operation check control that one of the first electromagnetic valve and the second electromagnetic valve is abnormal that the valve cannot be closed, the control unit opens the first electromagnetic valve and the second electromagnetic valve, and the first supply device supplies the brake fluid to the first wheel cylinder.

5. The vehicle braking device according to claim 1, further comprising:
- a pressure sensor configured to detect a hydraulic pressure of the first wheel cylinder; and
- a control unit configured to executes at least one of a first operation check control and a second operation check control at a predetermined timing, the first operation check control being an operation check control for the first electromagnetic valve, and the second operation check control being an operation check control for the second electromagnetic valve, wherein the first operation check control includes:
- a first supply processing of closing the first electromagnetic valve, opening the second electromagnetic valve, and operating the first supply device so as to supply such an amount of the brake fluid to the first supply path that a hydraulic pressure in the flow path between the first electromagnetic valve and the first supply device is a first predetermined pressure less than a differential pressure resistance of the first electromagnetic valve when valve-closing of the first electromagnetic valve is normal;
- a first valve-closing determination processing of determining whether or not the valve-closing of the first electromagnetic valve is normal based on a detection value of the pressure sensor accompanying the execution of the first supply processing; and
- a first valve-opening determination processing of, when the first supply processing is completed and it is determined that the valve-closing of the first electromagnetic valve is normal in the first valve-closing determination processing, opening the first electromagnetic valve, and then determining whether or not valve-opening of the first electromagnetic valve is normal based on a detection value of the pressure sensor, and the second operation check control includes:
- a second supply processing of opening the first electromagnetic valve, closing the second electromagnetic valve, and operating the first supply device so as to supply such an amount of the brake fluid to the first supply path that a hydraulic pressure in the flow path between the second electromagnetic valve and the first supply device is a second predetermined pressure when valve-closing of the second electromagnetic valve is normal;
- a second valve-closing determination processing of determining whether or not the valve-closing of the second electromagnetic valve is normal based on a detection value of the pressure sensor accompanying the execution of the second supply processing; and
- a second valve-opening determination processing of, when the second supply processing is completed and it is determined that the valve-closing of the second electromagnetic valve is normal in the second valve-closing determination processing, opening the second electromagnetic valve, and then determining whether or not valve-opening of the second electromagnetic valve is normal based on a detection value of the pressure sensor.

6. The vehicle braking device according to claim 5, wherein
when it is determined by at least one of the first operation check control and the second operation check control that one of the first electromagnetic valve and the second electromagnetic valve is abnormal that the valve cannot be closed, the control unit opens the first electromagnetic valve and the second electromagnetic valve, and the first supply device supplies the brake fluid to the first wheel cylinder.

* * * * *